Figure 15:
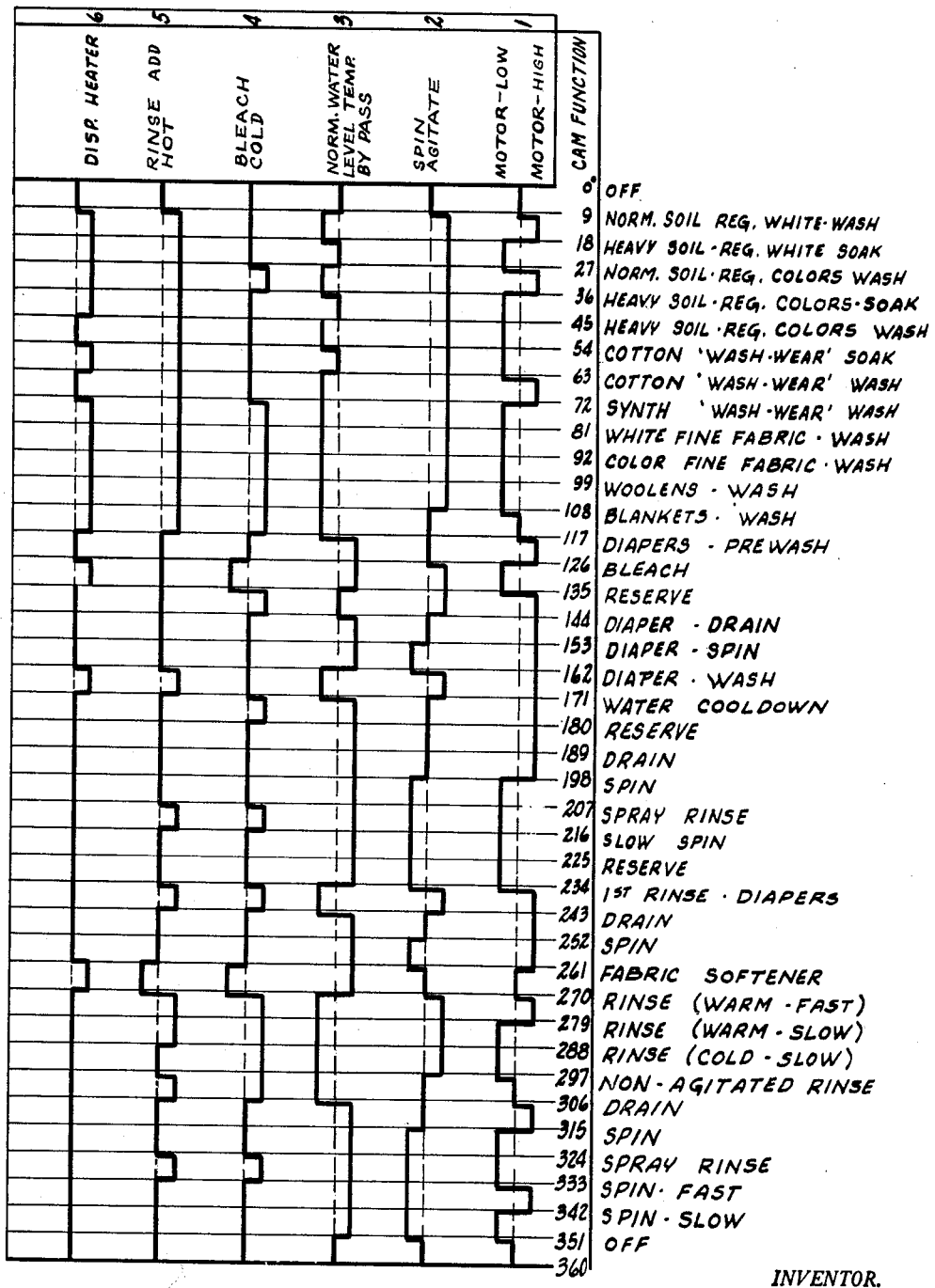

June 8, 1965 M. E. ANDERSON 3,188,504
MULTI-CYCLE PROGRAM TIMER
Filed Dec. 12, 1960 7 Sheets-Sheet 1
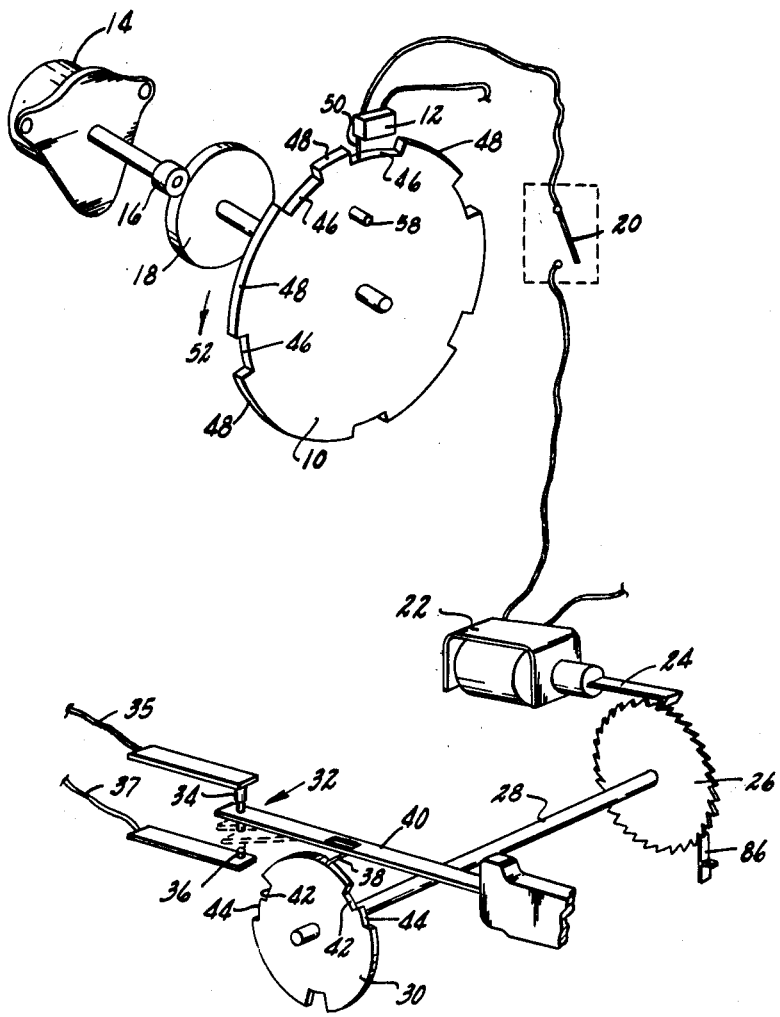
INVENTOR.
MAYNARD E. ANDERSON
BY
WILSON, SETTLE, McRAE & CRAIG
ATTORNEYS

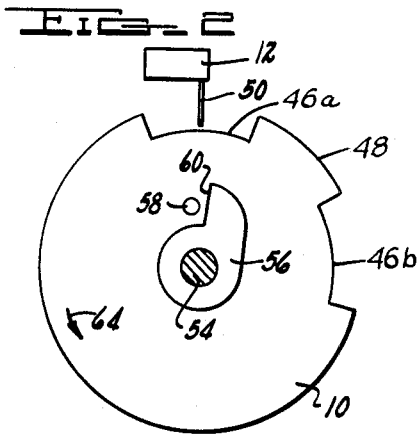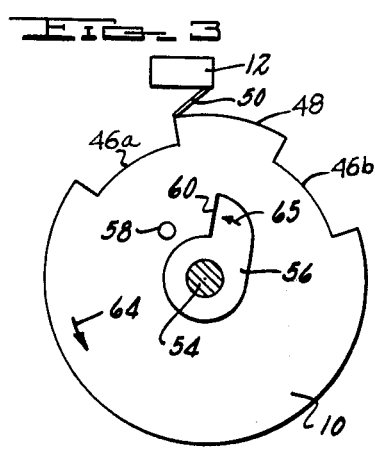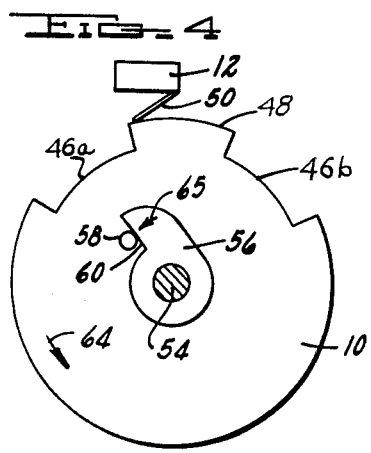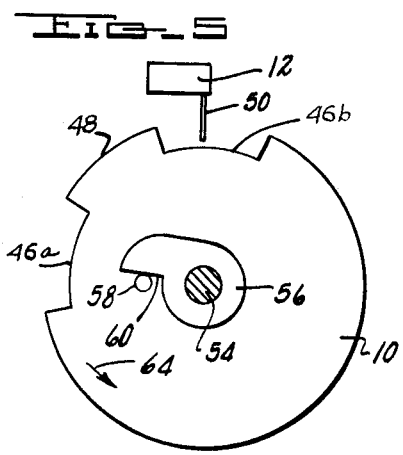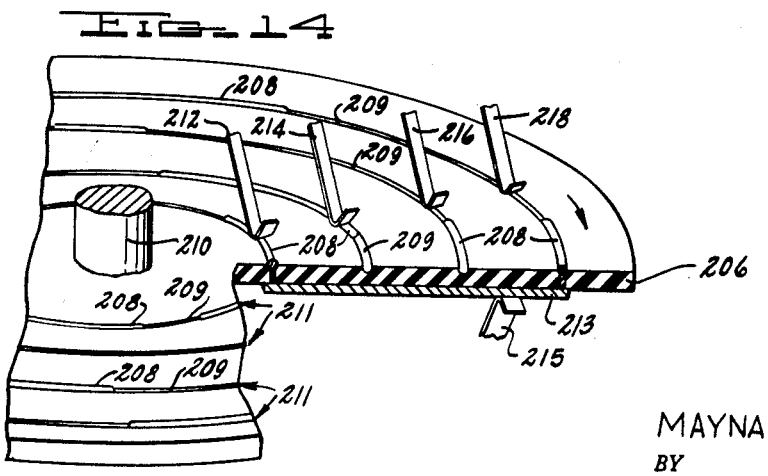

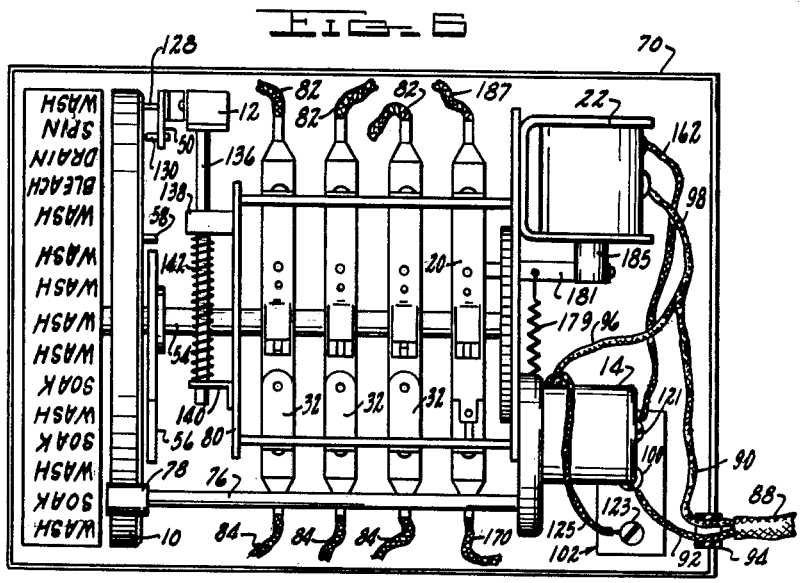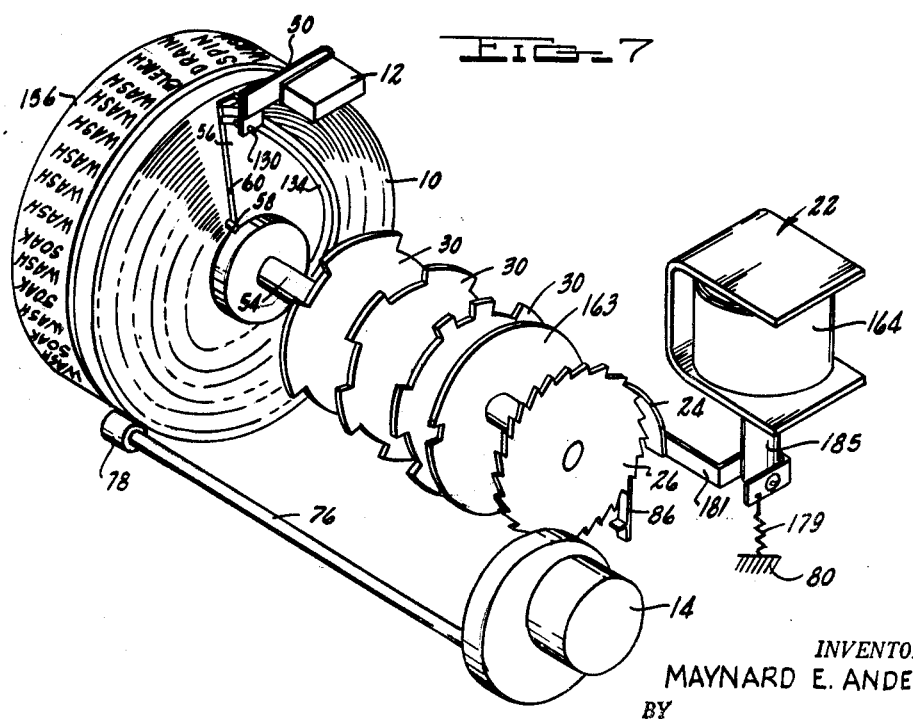

June 8, 1965 M. E. ANDERSON 3,188,504
MULTI-CYCLE PROGRAM TIMER
Filed Dec. 12, 1960 7 Sheets-Sheet 4
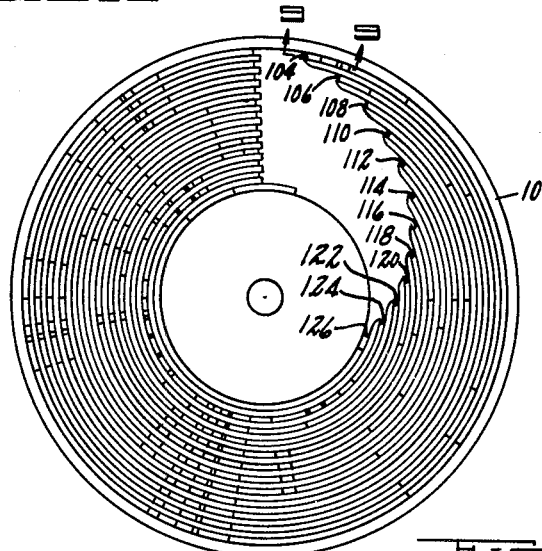
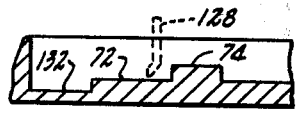
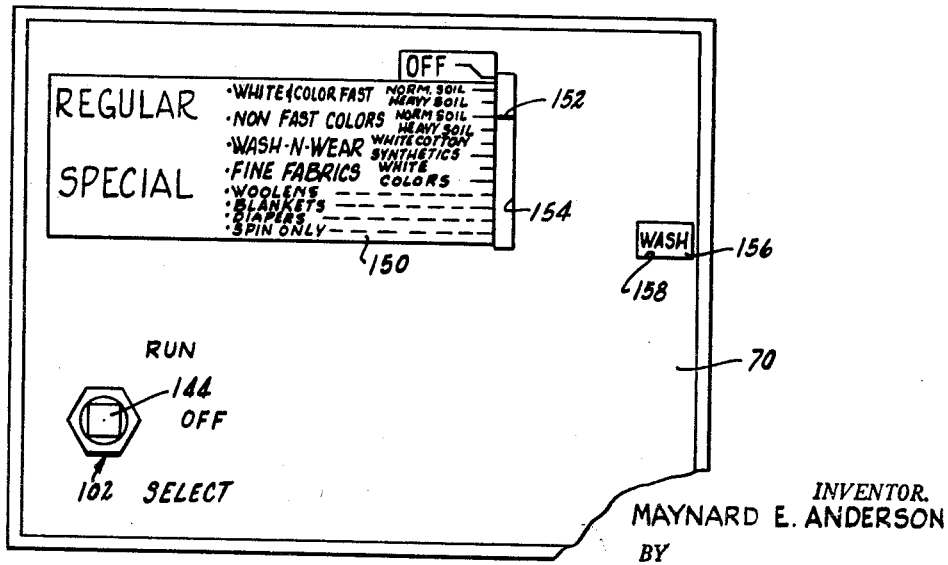
INVENTOR.
MAYNARD E. ANDERSON
BY
WILSON, SETTLE, McRAE & CRAIG
ATTORNEYS June 8, 1965
M. E. ANDERSON
3,188,504
MULTI-CYCLE PROGRAM TIMER
Filed Dec. 12, 1960
7 Sheets-Sheet 5
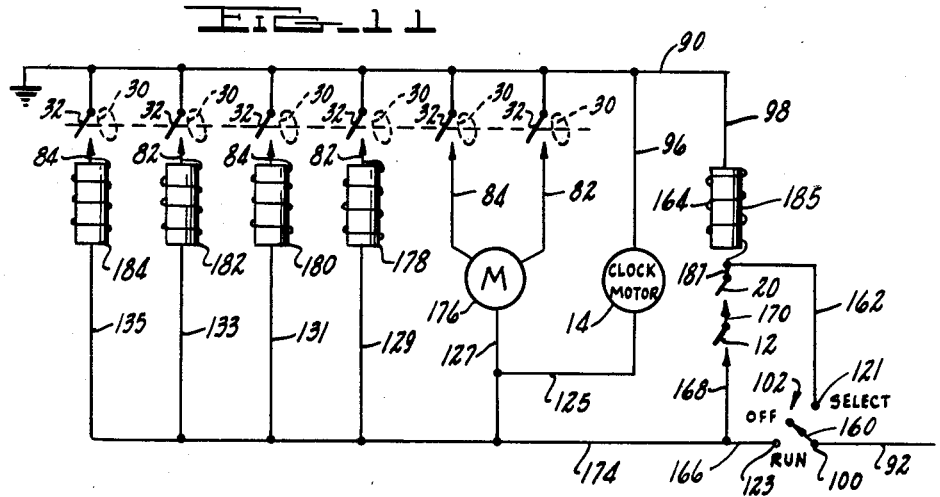
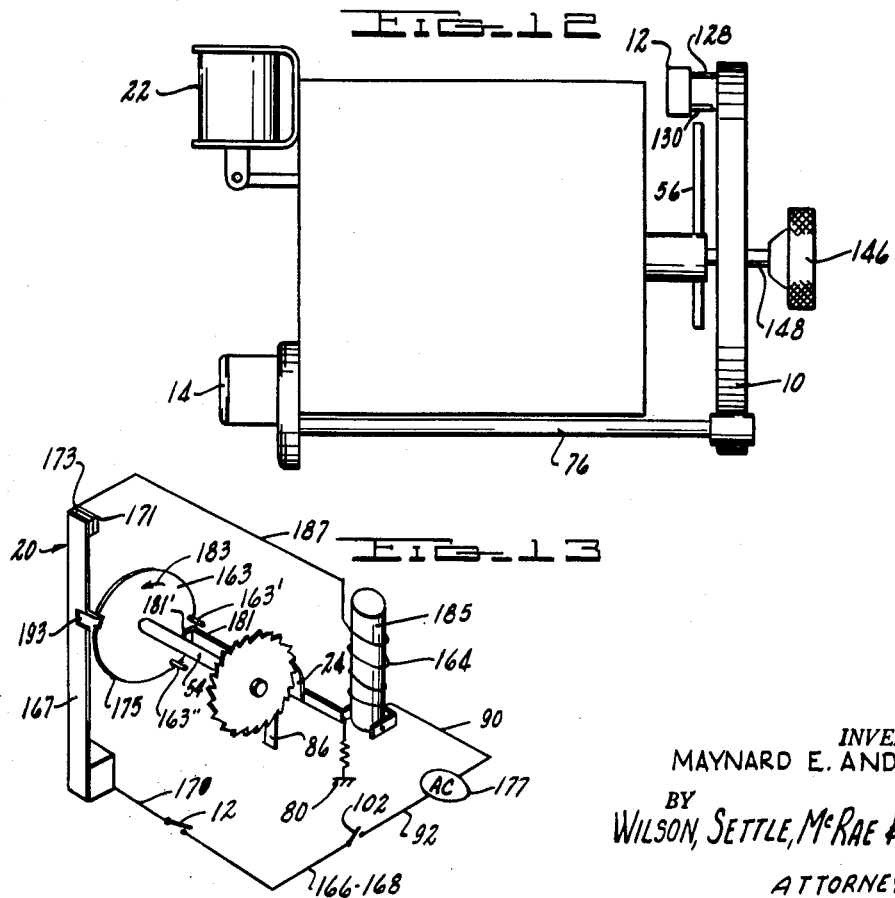
INVENTOR.
MAYNARD E. ANDERSON
BY
WILSON, SETTLE, McRAE & CRAIG
ATTORNEYS

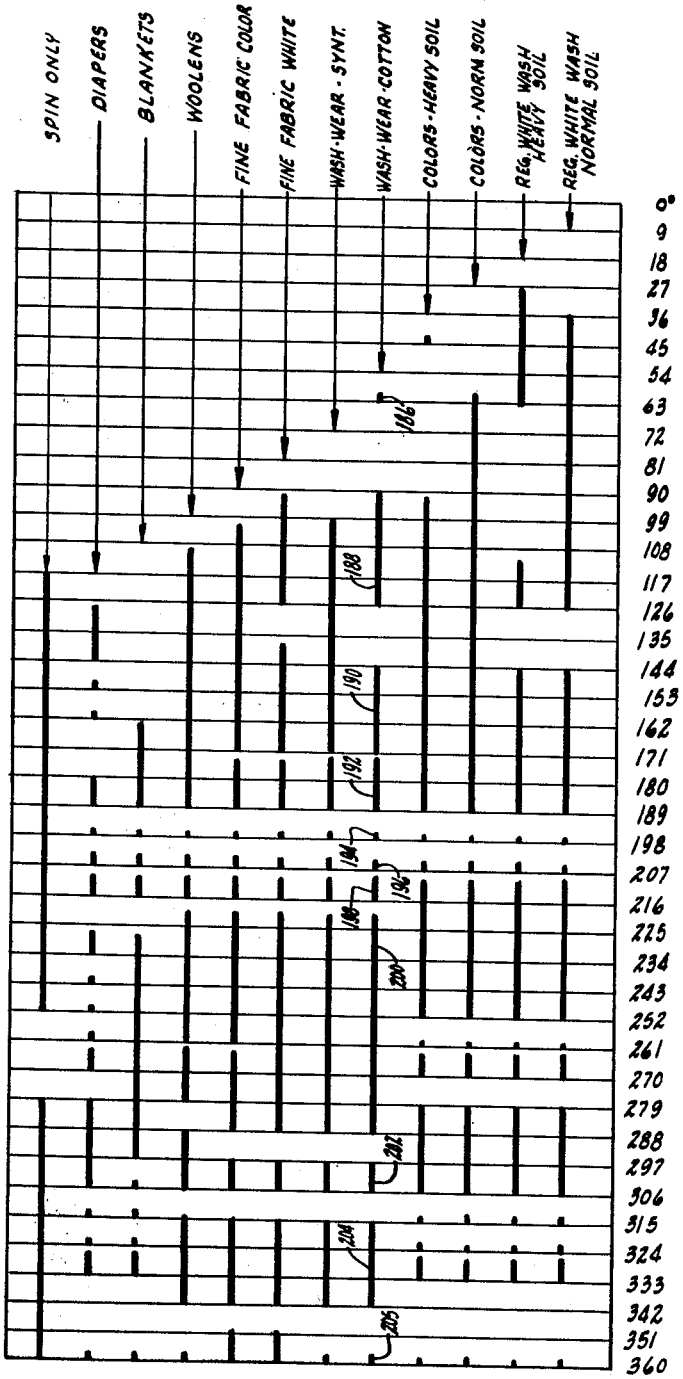

United States Patent Office 3,188,504
Patented June 8, 1965

3,188,504
MULTI-CYCLE PROGRAM TIMER
Maynard E. Anderson, Detroit, Mich., assignor to American Radiator & Standard Sanitary Corporation, New York, N.Y., a corporation of Delaware
Filed Dec. 12, 1960, Ser. No. 75,330
24 Claims. (Cl. 307—141.4)

This invention relates to a timer or control device for sequentially actuating a series of electrical circuits and more particulraly to such a control device operating on a "master" and "slave" principle whereby it is possible to obtain a large number of different controlled programs with a minimum number of operating parts.

The need for an improved timer for automatic domestic washing machines has been evident for a number of years. The requirements placed upon the timer by the increasing complexity of laundry operations, for example, the need for many special washing operations to properly care for new fabrics and the consumer demand for push-button automation, have greatly overburdened and outdated the conventional "impulse" timer which have been used almost exclusively since the advent of the automatic washer. The current trend in automatic home laundries is towards truly automatic operation, whereby the user selects a single laundry cycle based upon the type of wash load and the timer then takes over to select, sequence, and otherwise govern all of the many variables of the cycle, such as wash time, wash temperature, wash agitation speed, soap condition, use of detergent and bleach, water extraction (spin) duration and spin speed, rinse temperature, use of spray rinses and duration of rinse agitation and agitation speed. Such automatic control permits the homemaker to obtain the best laundry results for any particular wash load without being concerned with the peculiarities and characteristics pertaining to each different type of fabric. The homemaker need not know that for "wash-and-wear" denims, for example, wash water should be cooled prior to spin to prevent undesired wrinkling of the material. This requirement is automatically attended to by the timer. However, accommodating all of the new laundry cycles and operations has led to expansive and cumbersome modifications of the old "impulse" timer. Most important, the resulting "program" timers still have not provided the flexibility required by modern laundry techniques.

While the present invention was developed with particular reference to the home appliance industry, application of the device to mechanisms and processes far afield from the appliance industry are possible. There are many instances in homes and industries where control of a broad range of program operations is desired, for example, material processing plants, food processing plants, and the like. The invention will, however, be described in connection with use on a home washing machine to illustrate its operation and function.

It is an object of the invention to provide a program timer which is capable of providing an almost unlimited number of distinctly different cycles.

Another object of the invention is to provide a program timer which has capacity for large numbers of electric circuits and which requires very few cams and timer switches to accommodate the most elaborate cycle.

A further object is to provide such a program timer which utilizes a power solenoid providing high torque to the switch cams so that high contact pressures can be used even with a large number of circuits.

Another object is to provide an arrangement in which a timer motor having a low cost and low torque may be used.

A further object of the invention is to provide a program timer in which the length of event time is flexible.

A still further object is to provide such a timer in which any reasonable number of events may occur in any one cycle.

Another object of the invention is the provision of a program timer which may be remotely operated.

A further object is to provide a timer design which is capable of accommodating conventional switch cams and switches.

A still further object is to provide a timer mechanism in which timer variations from model-to-model and manufacturer-to-manufacturer are very simply achieved.

Other objects of this invention will appear in the following description and appended claims, reference being had to the accompanying drawings forming a part of this specification wherein like reference characters designate corresponding parts in the several views.

In the drawings:
FIG. 1 is a diagrammatic view of one embodiment of the program timer device of the present invention;
FIGS. 2 through 5 are diagrammatic views of the master cam and associated switch in various operative positions illustrating the means for correlating the position of the master cam with various slave cams;
FIG. 6 is a rear elevational view of structure utilized in one embodiment of the invention;
FIG. 7 is a perspective view of the structure of FIG. 6 with parts removed for the purpose of clarity;
FIG. 8 is a top plan view of the master cam;
FIG. 9 is a sectional view of one of the tracks of the FIG. 8 cam showing the profile thereof;
FIG. 10 is a front elevational view of the FIG. 6 timer structure;
FIG. 11 is a schematic illustration of the electrical system utilized with the timer structure;
FIG. 12 is a side elevational view of the timer structure illustrating one structure for manual cycle selection;
FIG. 13 is a diagrammatic view of an interrupter-switch mechanism utilized in the timer structure;
FIG. 14 is a perspective view of a printed circuit switching mechanism which may be utilized in place of the conventional cam-type switch-operating mechanism;
FIG. 15 is a graph showing the profile of six different cams utilized as switch-actuating mechanisms in a typical washing machine application; and
FIG. 16 is a graph correlated with the FIG. 15 graph showing various programs provided on a master cam for the cam system of FIG. 15.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The control device of this invention comprises essentially master programming means having a plurality of cycles of operations, slave drive means actuable by the master programming means, and slave switch-operating means having a plurality of cycles of operations (the cycles being dependent on the cycle of the master program). The master programming means is operative to actuate the slave drive means to position the slave switch-operating means at a predetermined operating position and has a normal timed movement which maintains the slave switch-operating means at the operating position for a predetermined time. The control device also includes means to correlate the cycle of operation of the master programming means with the cycle of the slave switch-actuating means. The correlating means are operable upon each positioning of the slave-operating means by the master programming means to take over the drive of the master means whereby the master device will operate both as a timing device and a positioning device.

To illustrate the principle of operation, a greatly simplified diagrammatic view of the system is shown in FIG. 1. The master programming means comprises a program cam 10 which operates signaling means comprising a read-out switch 12 to an on or off position. The cam 10 is normally driven by a timer or clock motor 14. The driving connection between the motor 14 and cam 10 is a frictional drive comprising, as shown in FIG. 1, friction discs 16, 18. The purpose of such a friction drive is to permit the cam 10 to be driven at a higher rate of speed during the slave positioning operation without carrying the timer motor along with it.

The read-out switch 12, when actuated, operates an interrupter switch 20. The interrupter switch in turn operates a stepping solenoid 22. The stepping solenoid 22 has a pawl 24 in operative relationship to a ratchet wheel 26, and is operative upon actuation to rotate the wheel 26 a predetermined number of teeth. The number of teeth which the ratchet is rotated is determined by the number of impulses received from the interrupter switch. The ratchet wheel 26 is fixed to a shaft 28 which carries a plurality of switch-operating slave cams 30 (only one slave cam 30 is shown, however, it will be appreciated that any number of such cams may be positioned on the shaft 28). The switch-operating cams 30 actuate switches 32 which turn various electrical components off and on. The position of the switch-operating cams 30 determines whether or not the switch controlled thereby will be turned off or on. For example, the switch shown is a three position switch, having switch arm 40 which can make upper contact 34 and lower contact 36, the middle position being an off position. Contacts 34, 36 are connected to two different circuits through leads 35, 37. As shown, the depending finger 38 of switch arm 40 is riding on the outer periphery of cam 30. This arrangement makes the upper contact 34. If the finger 38 were positioned in one of the deep cutouts 42, the switch arm 40 would spring downwardly to close the circuit through the lower contact 36. If the switch arm finger 40 were positioned in one of the medium deep cutouts 44, the switch arm 40 would be positioned between the upper and lower contacts 32, 34 and both circuits controlled thereby would be open.

As may be noted, the program cam 10 has recorded thereon a cycle of operation comprising a series of peripheral cutouts 46 and a series of land portions 48. These portions may be referred to as signaling and non-signaling portions. When the switch spring arm 50 of the read-out switch 12 is positioned in a cutout 46, the switch is open and the interrupter switch 20 and stepping solenoid 22 are deactivated. When arm 50 contacts a land portion 48, the switch will be closed. The program cam 10 is driven by the timer motor 14 in the direction of arrow 52 until the next succeeding land portion closes the switch 12. During the period of time in which switch 12 is open, the cams 30 will dwell in the position at which they are situated. The length of the cutout portion 46 and the speed of rotation of the cam 10 thus determine the dwell time for a given operation. The length of each land portion 48 plus the length of each preceding cutout portion 46 determines through what angle the switch-operating slave cams will be turned. It should be noted at this point that time is not a factor in determining the angle through which the cams 30 will be rotated. This is one of the novel features of the invention and is advantageous both from the point of view of accuracy and also total elapsed time for the complete cycle.

The method by which rotation of the cam to new positions is accomplished is illustrated in FIGS. 2 through 5. As thereshown, the read-out switch 12 has its arm 50 in operative relationship with the program cam 10. The cam 10 is rotatably mounted on shaft 54 to make it a floating cam. The shaft 54 also carries correlating means comprising a dog member 56. The dog member 56 is fixedly mounted on shaft 54. The shaft 54 also carries switch-operating cams 30 (not shown) fixedly mounted thereon. A pin 58 is provided on the face of the program cam 10. The pin 58 projects outwardly into operative relationship with face 60 of dog member 56.

In the position shown in FIG. 2, arm 50 of switch 12 is positioned in a cutout portion 46a. In this position, switch 12 is open and the switch-operating cams 30 will dwell in whatever position they occupy, as previously explained. The timer motor 14 will drive the program cam 10 in the direction of arrow 64 until the next succeeding land portion 48 is reached.

As shown in FIG. 3, as the program cam 10 continues rotation, the pin 58 moves away from the cam member face 60. When the land portion 48 contacts the switch arm 50, it closes this switch and actuates the interrupter switch and stepping solenoid. The stepping solenoid rotates the shaft 54 in the direction of arrow 65. Rotation of shaft 54 carries the switch-operating slave cams to a new position. Rotation of this shaft also carries the dog member 56. Stepping solenoid 22 is designed to rotate the shaft 54 at a much higher speed than the normal timed angular velocity of the program cam 10. As shown in FIG. 4, the cam face 60 will contact the pin 58 very soon after the stepping solenoid is actuated. As shown in FIG. 4, the program cam 10 moves only a very little distance before the pin 58 is engaged by dog 56. For all practical purposes, engagement of pin 58 may be considered to be instantaneous upon actuation of the solenoid 22.

When dog 56 engages pin 58, it will drive the program cam 10 rapidly over the land portion 48 until, as shown in FIG. 5, the switch arm 50 reaches the second cutout 46b at which time the stepping solenoid will be de-energized and rotation of the shaft 54 will be discontinued to permit the slave cams to dwell in their new position for the desired length of time. The distance through which the switch-operating shafts are moved is equal to the angle subtended by the arc of the program cam cutout portion 46a plus the land portion 48. Drive of program cam 10 by the cam 56 is permitted, it will be remembered, because of the friction drive between the program cam and its timer motor 14.

It will be appreciated that the duration of any dwell may be made long or short simply by varying the length of the respective cutouts in the program cam. Similarly, the number of steps the stepping switch moves can be altered by changing the land portions of the program cam. As a consequence, the stepping solenoid 22 can readily be made to step to any desired rotary position and to remain at that position for any reasonable period of time.

The structure of one embodiment of the invention may be seen by reference to FIGS. 6 and 7. As thereshown, the mechanism is mounted within an enclosure 70. The elements of the master programming means are the program cam 10 floatingly mounted on shaft 54, the read-out switch 12, and the timer motor 14. The program cam 10, as may be seen in FIG. 8, is provided with a series of concentric grooves 104 through 126 in one face to accommodate a number of different programs for a washing machine. These grooves form tracking means for the switch 12. The read-out switch 12 is shiftable radially to the desired groove as will be explained more fully hereinafter. The configuration of a typical groove is illustrated in FIG. 9. As thereshown, a finger 128 of arm 50 of switch 12 is in a depressed or cutout portion 72 wherein the switch 12 is in the open position. Adjacent the cutout 72 is a land 74 which is capable of contacting finger 128 and pivoting the arm 50 to close the switch.

The timer motor 14 has an output shaft 76 which extends to the cam 10. Circular friction element 78 carried on the end of shaft 76 engages the outer periphery of the cam 10 to provide a driving connection to turn the program cam at a constant speed. The friction drive wheel 78 allows the program cam to be advanced by the stepping solenoid without pulling the timer motor along.

Fixedly mounted on the shaft 54 are three switch-operating cams 30. The cams 30 are each associated with a three-position switch 32 mounted on bracket 80. The switches 32 each have one lead 82 leading to an electrical device and a second lead 84 leading to another electrical device. Mounted adjacent the switches 32 is the interrupter switch 20 having a cam 163 floatingly mounted on shaft 54. Also carried on the bracket 80 is the stepping solenoid 22. The solenoid 22 has a plunger 185 to which is connected an arm 181. The arm 181 is operatively connected to cam 163 and carries pawl 24 which engages ratchet wheel 26. A spring 179 is attached at one end to arm 181 and at its other end to the bracket 80. The ratchet wheel 26 is fixedly carried on shaft 54 and is engaged by an escapement device 86 to complete the usual ratcheting arrangement.

An electric cord 88 extends through an opening in the enclosure 70 which is provided with a grommet 94. The cord 88 has a ground lead 90 and a hot lead 92. The ground lead 90 has a branch lead 96, 98 which are secured to the timer motor 14 and stepping solenoid 22, respectively, to provide the ground therefor. Due to their physical connection with the bracket 80, these elements also provide a ground for the switches which are secured to the bracket. The hot lead 92 is connected to terminal post 100 of a selector switch 102.

As previously mentioned, the read-out switch 12 is shiftable radially to the desired groove in the program cam 10. As shown in FIG. 8, the cam 10 has twelve different grooves 104 through 126. Each of these grooves provides a different program for the washing machine. The mechanism for permitting this selection is shown in FIGS. 6 and 7. The arm 50 of the switch 12 is provided with two pins 128, 130 which project towards the program cam 10. One of the pins 128 is longer than the other pin 130. The pin 128 normally rides in one of the program cam grooves to actuate the arm 50 during the cycle of operation. The other pin 130 is utilized to shift the read-out switch to the desired program groove. As will be noted in FIG. 8, the starting point of each groove in the program cam is spaced a little forward of the preceding groove to form a continuous forwardly projecting curve of starting points. Each groove is provided at its starting point with a deep recessed cutout portion 132 (FIG. 9) for the long pin 128. When the long pin 128 is positioned in the depression 132, the arm 50 is positioned close enough to the program cam to permit the short pin 130 to engage groove 134 of dog member 56. The groove 134 has a configuration which mates with the curve formed by the starting points of the various cam surface grooves. It will thus be appreciated that movement of the dog 56 will tend to carry with it the switch 12 when the short pin 130 is engaged. As will be noted in FIG. 7, movement of the dog 56 will also move the program cam 10 because in the initial position of the elements, the program cam pin 58 engages the face 60 of the dog 56.

As shown in FIG. 6, the switch 12 is mounted on a rod 136 which is slidingly mounted in brackets 138, 140 carried on the main bracket 80. A spring 142 is provided to bias the switch 12 towards its uppermost position. In operation the dog 56 is moved in individual steps, each corresponding to a different groove in the program cam 10. Each step of the dog 56 moves the switch 12 radially inwardly to be in line with the next succeeding program cam groove, and also moves the program cam forward one step so that the long pin 128 will be in registry with the starting position of the particular groove involved.

Movement of the dog 56 is accomplished by means of solenoid 22 in combination with the selector switch 102. As may be noted in FIG. 10, the selector switch 102 is provided with a knob 144 on the outside of the enclosure 70. The switch 102 is a three-position switch. One position of the switch is labeled select. When the switch is positioned in "select," depression of the knob 144 will act to energize the solenoid 22 to thus move the ratchet wheel a distance of one tooth. Movement of the ratchet wheel, of course, rotates the shaft 54 and consequently the dog 56. Each depression of knob 144 will cause the dog 56 to advance one tooth and to move the switch 12 in line with a different groove on the program cam.

As soon as the program cam begins to rotate, the pin 128 will contact a higher portion in the groove (see FIG. 9) and lift the short pin 130 out of the groove 134. This permits the switch 12 to follow the groove of the program cam. When the cycle of operation of the program cam is complete, the spring 142 will move the read-out switch 12 back to its original position.

An alternate method of driving the dog 56 to provide the desired program selection is illustrated in FIG. 12. As there shown, a knob or thumb wheel 146 is provided secured to the dog 56 by means of a shaft 148. Turning of the knob 146 turns the shaft 148 thus providing an action similar to the step-by-step solenoid movement.

The control panel arrangement for the device is illustrated in FIG. 10. As there shown, an indexing plate 150 is provided to indicate the type of clothes which may be washed by different programs of the machine. Selection of the desired program is, as previously described, accomplished by turning the switch 102 to the select position and thereafter depressing it the number of times necessary to position the read-out switch in line with the desired program groove. A hair-line pointer 152 is provided adjacent the index plate 150 to indicate what groove is in alignment with the read-out switch. The pointer 152 is attached to the readout switch 12 and is visible through a slot 154 in the enclosure. The actual event taking place at any given time in the washing cycle may be visibly indicated by means of a drum 156. The drum 156 is fixedly secured to shaft 54 adjacent the program cam. The event occurring is printed on the peripheral surface of the drum 156 and is visible through a slot 158 in the enclosure. As will be appreciated, the drum 156 will rotate along with the shaft 54 as a result of actuation of the stepping solenoid 22.

The electric circuitry of the control mechanism is shown in FIG. 11. The hot lead 92 is connected to terminal 100 of switch member 160 of the selector switch 102. The switch member 160 is positionable on any one of the three positions (run, off or select). The ground lead 90 is positioned on the other side of the various electrical components to complete the circuits through the entire system. A lead 162 extends from the select position 121 directly to the coil 164 of solenoid 22. It will be appreciated that closing the circuit through the select position will energize the coil 164. Repeated energization of coil 164 followed by de-energization will cause the stepping action to position the read-out switch in line with the desired program cam groove as previously discussed.

Lead 166 extends from the run position 123 of switch 102. A branch lead 168 extends to read-out switch 12 (shown in the open position). A lead 170 extends from the read-out switch to the interrupter switch 20 (shown in the open position). As will be appreciated, closing of the read-out switch will close the circuit to the interrupter switch. The interrupter switch will then repeatedly open and close. In its closed position, it will activate solenoid coil 164 and in its open position will deactivate coil 164 to give the desired stepping action.

The interrupter switch 20 and associated components and circuit is illustrated in FIG. 13. The switch 20 comprises a cam 163 mounted to float on shaft 54. A cutout 197 is provided in the outer periphery of the cam to receive finger 193 of spring arm 167. The cam has a pair of projecting spaced apart pins 163', 163" between which extends finger 181' of arm 181. Arm 181 is also attached to pawl 24 which engages ratchet wheel 26 which is fixedly mounted on shaft 54.

When coil 164 is energized, its magnetic field will cause the plunger 185 to move upwardly until finger 181' engages pin 163' to consequently rotate the cam 163 in the direction of arrow 183 and to advance the wheel 26 the distance of one tooth. Upon de-energization of coil 164, spring 179 will retract plunger 185 and the finger 181' will eventually engage pin 163" and rotate cam 163 back to its start position. Wheel 26, however, is held in its advanced position by escapement 86.

The coil 164 is connected to power 177 through lead 90. The circuit to the other side of power comprises lead 187, contacts 171, 173, switch arm 167, lead 170, switch 12, leads 156, 168, switch 102, and lead 92. Upon the manual closing of select switch 102 and the closing of read-out switch 12 by the master cam, the circuit through coil 164 is closed, thus energizing the coil. Energization of coil 164 will cause the previously mentioned rotation of cam 163, moving the cutout 197 out of engagement with finger 193, causing the finger to engage the outer periphery 175 of the cam and deflect the arm 167, thus opening normally closed contacts 171, 173. Opening of these contacts opens the circuit through coil 164. Upon de-energization of the coil, spring 179 will rotate the cam 163 back to its start position, thus closing contacts 171, 173 and starting the cycle over again. The cycle will be repeated as long as the switches 12, 102 are closed. The arrangement of spaced pins 163', 163" and finger 181' ensures that contacts 171, 173 will be opened and closed only at the beginning and end of the stroke of plunger 185. This prevents chattering of the solenoid.

Returning again to FIG. 11, a second branch lead 174 extends from the lead 166. Branch lead 174 has sub-branch leads 125, 127, 129, 131, 133, 135 which complete the circuits back to lead 90 through the timer clock motor 14 and also through the various components controlled by the program apparatus. These may be, for example, a washing machine motor 176, a coil 178 to control spinning, a coil 180 to operate a dispenser, a coil 182 to control a cold water valve, and a coil 184 to control a hot water valve. The ground side of these various components is connected through the three-position switches 32. The switches 32 are, as previously discussed, controlled by switch-operating cams 30.

The cycle of operation for a typical wash load may be illustrated as follows: Assume that the load is to be white cotton wash-wear such as men's white shirts. The housewife turns the control knob 144 to select, and depresses it five times until the pointer 152 on the control panel moves to the desired "white cotton wash-wear" cycle. The housewife then turns the control knob to "run" position. The balance of the cycle is then automatic. Reference to FIGS. 15 and 16 gives a good indication of the correlation between the various cams used to operate the switches and the program of the program cam. FIG. 15 shows the profile of the slave cams and illustrates a slave mechanism having six different cams to: (1) operate the washing machine motor at a high or low speed, (2) to provide for agitate or spin, (3) to provide water level bypass and for normal water level, (4) to control the cold water input and the dispensing of bleach, (5) to control the hot water input and the dispensing of rinse additives, and finally (6) to control a dispenser heater (such heaters are used in a "heat pump" type of dispenser). The program cam design shown in FIG. 16 includes twelve different programs. The heavy line indicates a period in which the stepping solenoid is activated. The two graphs are laid out to indicate 360 degrees, and are laid out in 9 degree increments each of which corresponds to one step of the stepping solenoid.

Assuming that the "white cotton wash-wear" cycle has been selected, the select switch is turned to "run" and the cycle will proceed. This particular automatic cycle includes a first soak operation. In order to achieve the "wash-wear" cycle, the stepping solenoid will have advanced the switch-operating cam six steps to the 54 degree position. As may be observed from FIG. 15, the following circuits are engaged at this position: hot water (low water level), dispenser heater (detergent), drive motor, and agitate solenoid. However, according to standard practice, a pressure switch in the machine will allow only the water solenoid and the dispenser to be energized until the washer has been filled. After water has snapped the pressure switch to "full" the water fill circuit and dispenser heater are de-energized and the following circuits are energized for two minutes (stepping switch remains at 54 degree position): drive motor (low speed), agitate solenoid, the clock motor (not controlled by the timer cam) is energized and the master program cam begins to turn, timing the soak operation.

When the pin 128 reaches the first land portion 186, the stepping solenoid will be closed for a short time to advance the cams 30 to the 63 degree position. In the program shown, the cams will remain in this position for six minutes, as dictated by the groove length upon the program cam which turns at 4½ degrees per minute in the embodiment shown. In this position, the "normal" water level circuit is closed; to complete the fill begun during "soak", hot water flows until the pressure switch snaps (this action does not affect the motor or agitation circuit); dispenser heater is de-energized; agitator circuit remains closed; clock motor continues to run, and the drive motor is energized (high speed).

When the pin 128 reaches land 188, the cams 30 will be advanced to the 126 degree position and remain there for four minutes. In this position, the bleach relay is energized, the dispenser heater is energized, the agitator solenoid is energized, the drive motor is energized (slow speed), and the pressure switch bypass is closed.

When the pin 128 has advanced to the 171 degree position, it will contact land 190 and advance to the 171 degree position. The cams 30 will dwell in this position for one minute. In this position, the bleach relay and dispenser heater are de-energized (agitator solenoid de-energized and pumping begins), the motor is energized (high speed), the bypass switch remains closed. The function of this step is to cool down the washing action.

The next step in the program is to drain the water from the washing machine. At the 172 degree position, the pin 128 will contact land 192 and advance the cams 30 to the 189 degree position for two minutes. In this position, the bypass switch remains closed, and the motor is energized (high speed pumping).

The next step in the cycle is to spin the clothes. When the pin 128 reaches land 194 at the 196 degree position, the cams 30 will be advanced to the 198 degree position for one minute. In this position, the bypass switch remains closed, the motor is energized (low speed), and the spin solenoid is energized.

The next operation is a spray. When pin 128 reaches land 196, the cams will be advanced to the 207 degree position for one-half minute. In this position, the motor will be run at low speed, the spin solenoid and bypass circuit will remain energized, the hot water solenoid will be energized, and the cold water solenoid will be energized.

After the spray operation, the clothes are again spun at a slow speed. At the 208 degree position, pin 128 will contact land 198 and advance the cams 30 to the 216 degree position for one minute. In this position, the motor, spin solenoid, and bypass circuits remain energized. The hot and cold water circuits are de-energized.

The succeeding operation is a deep rinse. At the 218 degree position, pin 128 contacts land 200 to advance the cams 30 to the 288 degree position. In this position, the cold water solenoid is energized and the normal-waterlevel switch is closed. After "low" switch snaps, the following circuits are completed for two minutes: motor (low speed) and agitation solenoid.

The next operation is a draining operation. When pin 128 reaches the 295 degree position it will contact land 202 and advance the cams 30 to the 306 degree position for two minutes. In this position, the cold water solenoid, the normal-water-level circuit, and the agitator solenoid are energized. The motor and bypass circuits are closed.

The final operation is a slow spin. At the 313 degree position, pin 128 will contact land 204 and advance the cams to the 342 degree position for four minutes. In this position, the bypass circuit remains closed, the motor is energized at low speed, and the spin solenoid is energized. At the end of 357 degrees, land 205 is contacted and the stepping solenoid will advance the program cam to 0 position along with the cams 30. All action will cease at this point and the device will have to be recycled in order to again begin a new program.

The remaining eleven programs operate according to the same principle indicated for the wash-wear program. It is of course possible to have many other different programs and to increase or decrease the number of programs and/or the number of cams and the number of electrical components controlled thereby. In the discussion of the control device, various components have been given specific structural specifications to illustrate the practice of the invention. However, it will be appreciated that many other conventional components could be used to accomplish the desired function. For example, motion of the master and slave devices may be linear rather than rotative as shown.

Another way in which the device may be altered is to provide a printed circuit type of switching apparatus as illustrated in FIG. 14. Such apparatus would substitute for the cam 30 and the three-way switch arrangement. As shown, the printed circuit includes a disc 206 having concentric paths comprising conducting portions 208 with non-conducting portions 209 therebetween. The disc is preferably made of an insulating material. The conducting material may be solder provided in grooves 211 on the disc 206. An electrically conductive plate 213 is provided on the underside of disc 206 and contacts the conducting portions 208. A brush 215 rides on plate 211 to provide power to the circuit. The disc 206 is fixed to shaft 210 for rotation therewith. The shaft 210 is rotated by the stepping solenoid in the same manner as indicated for the cam 30. Riding on the paths of the disc 206 are four brushes 212, 214, 216, 218. The brushes are connected to different electrical components, such as a hot water solenoid or a spin solenoid. In operation, when the brushes are positioned on a conducting portion 208, they will complete a circuit through the components.

It will be appreciated that such a printed circuit system could also be applied to the master control device as a substitute for the program cam 10. In such an arrangement, the brush may be provided as an axially or radially shiftable member similar to the read-out switch 12 or a plurality of brushes may be provided to follow the paths of each circuit, each of the brushes being selectively connectable to the stepping solenoid or other drive member.

The control device heretofore described has a number of advantages inherent in its structure. For example, some of the advantages are as follows:

*1. Capacity for multiple programs or cycles*

The multiplicity of distinctly different cycles in this control device is almost unlimited; while only twelve cycles have been illustrated on the embodiment shown, as many more cycles as required may be added.

*2. Potentials for large number of electrical circuits*

The control device has the capacity for a large number of dependent electric circuits, and, because of the method of operation, fewer slave switches are required to accommodate the most elaborate cycle. The stepping solenoid 22 provides high torque to the switch-operating cams, so that high contact pressures can be used even with a large number of circuits. Conventional timers usually use a low-torque escapement technique. In this respect, it should be noted that a low-cost, low-torque timer motor may be used, because this motor drives only the program cam. With respect to the timer motor, attention is directed to the fact that a variable-speed motor may be incorporated into the design.

*3. Flexibility in event time*

The length of event time in this control device is completely flexible. The total time of any cycle may be lengthened or shortened as desired, or any single event can be made short or long.

*4. Flexibility in event per cycle*

Any reasonable number of events may occur in any one cycle.

*5. Adaptability for remote operation*

Remote operation is readily accomplished by locating the "select-run" switch at any desired point.

*6. Control of more than one device*

The control device may be used to operate more than one appliance or other device, for example, the dry cycle as well as the wash cycle of a combination wash-drying machine could be controlled.

*7. Conventional switching techniques*

The control devices may incorporate, as illustrated in the embodiment, a completely conventional switching system, or it may utilize a novel simplified switching system such as the printed circuit illustrated.

*8. Adaptability to different models and manufacturers*

The control device may be designed in one basic unit and utilized in connection with a large number of different models and manufacturers, for instance, in the appliance field.

Having thus described my invention, I claim:

1. A timer device comprising master programming means including means for scheduling a plurality of events; drive means actuable by the master programming means in accordance with said scheduling means; slave switch-operating means driven by said drive means; said master programming means being operative to actuate the drive means to position the slave switch-operating means at variable predetermined operating positions and to maintain the slave switch-operating means at an operating position for a predetermined time.

2. A timer device comprising master programming means including means for scheduling a plurality of events; drive means actuable by the master programming means; slave switch-operating means having a cycle of operation driven by said drive means; said master programming means being operative to actuate the drive means to position the slave switch-operating means at a predetermined operating position; means, operable upon positioning of the slave switch-operating means, to correlate the schedule of events of the master programming means with the cycle of the slave switch-actuating means; said master programming device being operable to maintain the slave switch-operating means at an operating position for a predetermined time.

3. A control device for sequentially activating a series of electrical circuits in accordance with a predetermined cycle of operation including a plurality of events, comprising master control means having a normal timed movement, said master control means having recorded thereon means for scheduling a plurality of events, means associated with the master control means for generating a signal in accordance with the recorded schedule of events, drive means actuable in response to the signal, slave control means positionable by the drive means, a series of electrical circuits activated in accordance with the position of the slave control means, and means operable upon each positioning of the slave control means to correlate the position of the master control means with the slave control means; the length of time the slave control means remains at each position being directly related to the normal timed movement of the master control means.

4. A device as claimed in claim 3 and further characterized in that the master control means has a plurality of different schedules of events recorded thereon; said signaling means being selectively responsive to any one of the schedule of events.

5. A control device for sequentially activating a series of electrical circuits in accordance with a predetermined cycle of operation, comprising master control means, slave control means controlled by the master control means; the master control means including track means; said track means having a cycle of operation recorded therealong; signaling means to track in said track means and being actuable in response to the recorded cycle of operation; said signaling means tracking at a normal timed rate; said slave control means including track means; said slave track means having switch-operating means positioned therealong; switching means to track in the slave track means and being actuable by the switch-operating means to sequentially activate a series of electrical circuits in accordance with the master cycle of operation; drive means interposed between the master control means and the slave control means; said drive means being operable, in response to a signal from said signaling means, to move the slave control means to a predetermined position; the slave control means remaining in said position until the drive means is again actuated by the master control means; the length of time which the slave control means remains in a given position being directly related to the normal timed movement of the signaling means.

6. A device as claimed in claim 5 and further characterized in that said drive means includes means to correlate, upon each actuation of the drive means, the positions of the slave control means and the master control means with respect to each other.

7. A device as claimed in claim 5 and further characterized in that the master control means has a plurality of different cycles of operation recorded thereon; said signaling means being selectively responsive to any one of the cycles.

8. A control device for sequentially activating a series of electrical circuits in accordance with a predetermined cycle of operation, comprising master control means, slave control means controlled by the master control means; the master control means including a rotatable member; track means on the rotatable member; said track means having a cycle of operation recorded therealong; signaling means to track in said track means and being actuable in response to the recorded cycle of operation; said signaling means tracking at a normal timed rate; said slave control means including rotatable track means; said slave track means having switch-operating means positioned therealong; switching means to track in the slave track means and being actuable by the switch-operating means to sequentially activate a series of electrical circuits in accordance with the master cycle of operation; drive means interposed between the master control means and the slave control means; said drive means being operable, in response to a signal from said signaling means, to rotate the slave control means to a predetermined position; the slave control means remaining in said position until the drive means is again actuated by the master control means; the length of time which the slave control means remains in a given position being directly related to the normal timed movement of the signaling means.

9. A device as claimed in claim 8 and further characterized in that said drive means includes means to correlate, upon actuation of the drive means, the positions of the slave control means and the master control means with respect to each other.

10. A device as claimed in claim 8 and further characterized in that the master control means has a plurality of different cycles of operation recorded thereon; said signaling means being selectively responsive to any one of the cycles.

11. A control device for sequentially activating electrical circuitry in accordance with a predetermined cycle of operation, comprising master control means, slave control means, and slave drive means interposed between the master and slave control means; said master control means comprising two members having relative movement, master drive means to drive one of said master members at a timed rate, a cycle of operation comprising alternate signaling and non-signaling portions recorded on one of said master members, the other of said master members including signaling means responsive to the signaling portions of the recorded cycle, said slave drive means being actuated in response to the signaling means, said slave control means including at least one pair of members being selectively positionable in different operative relationships with respect to each other, said slave members being effective to activate electrical circuitry in accordance with their different operative relationships, said slave drive means being effective to drive one of said slave members to different operative positions, correlating means to move with the driven slave member, said correlating means being effective after actuation of the slave drive means to temporarily supersede the master drive means and drive the driven master member over the signaling portion of the recorded cycle whereby the driven slave member is moved a distance related to the length of the signaling portion plus the length of the preceding non-signaling portion of the recorded cycle, said slave member remaining in this position for a time related to the timed movement of the driven master member and the length of the next succeeding non-signaling portion of the recorded cycle.

12. A device as claimed in claim 11 and further characterized in that the master control means has a plurality of different cycles of operation recorded thereon; said signaling means being selectively responsive to any one of the cycles.

13. A device as claimed in claim 11 and further characterized in that said driven master member is mounted for rotative movement.

14. A device as claimed in claim 11 and further characterized in that said slave control means includes a plurality of said pairs of slave members; the driven slave members being mounted for movement as a unit.

15. A device as claimed in claim 12 and further characterized in the provision of means for automatically positioning the signaling means in a selective one of the recorded cycles.

16. A control device for sequentially activating a series of electrical circuits in accordance with a predetermined cycle of operation, comprising master control means, slave control means, and slave drive means interposed between the master and slave control means; said master control means including a member rotatably mounted, master drive means to drive said rotatable member at a timed rate, track means on the rotatable member, a cycle of operation comprising alternate signaling and non-signaling portions recorded on said track means, signaling means to track in said track means and being actuable in response to the recorded cycle of operation, said signaling means being operative when actuated by the signaling portions of the cycle to actuate the slave drive means, said slave control means including at least one member rotatably mounted, switch-operating means along said slave rotatable member, switching means in operative relationship with said slave rotatable member and being actuable by the switch-operating means to sequentially activate a series of electrical circuits in accordance with their different operative relationships, said slave drive means being effective to drive said rotatable slave member to different operative positions, correlating means to move with the driven slave member, said correlating means being effective after actuation of the slave drive means to temporarily supersede the master drive means and drive the driven master member over the signaling portion of the recorded cycle whereby the driven slave member is moved a distance related to the length of the signaling portion plus the length of the preceding non-signaling portion of the recorded cycle, said slave member remaining in this position for a time related to the timed movement of the driven master member and the length of the next succeeding non-signaling portion of the recorded cycle.

17. A device as claimed in claim 16 and further characterized in that the master control means has a plurality of different cycles of operation recorded thereon; said signaling means being selectively responsive to any one of the cycles.

18. A device as claimed in claim 16 and further characterized in that said rotatable master member comprises a disc having a plurality of concentric grooves on one face to form the track means; said signaling and non-signaling portions comprising alternate raised and recessed portions in the grooves; said signaling means comprising a switch having an arm to track in the grooves; said arm being pivotable to close the switch when a raised portion is contacted thereby.

19. A device as claimed in claim 16 and further characterized in that said rotatable slave member comprises a cam having notches formed in the periphery thereof to form the switch-operating means.

20. A device as claimed in claim 16 and further characterized in that said rotatable master member is rotatably mounted on a shaft; said master drive means having a friction drive connection with the rotatable master member; said slave rotatable member comprising a plurality of cams having notches in the periphery thereof and fixedly mounted on said shaft for rotation therewith; said correlating means comprising a dog fixedly mounted on said shaft; means on said rotatable master member to engage said dog when the slave members are moved; said slave drive means driving said rotatable slave members at a higher rate of speed than the master drive means drives the master rotatable member whereby the dog will overtake the rotatable master member to supersede the friction drive of the master drive means.

21. A device as claimed in claim 20 and further characterized in that the rotatable master member comprises a disc having a plurality of concentric grooves on one face thereof to form the track means; a switch having an arm to track in the track means for actuation by the recorded cycle; and means to selectively position the switch arm in any one of the grooves; said means comprising a groove formed on the correlating dog; means on the switch signaling means to releasably ride in the dog groove; the signaling switch being shiftable radially to different grooves; rotation of the correlating dog with the signaling element engaged with the groove thereof being operative to shift the signaling switch from one master track to another.

22. A device as claimed in claim 21 and further characterized in that means are provided to manually rotate the correlating dog.

23. A device as claimed in claim 21 and further characterized in that switch means are provided to actuate the slave drive means selectively in steps; operation of said switch means with the signaling switch element in engagement with the correlating dog groove being operative to shift the signaling switch from one master member groove to another.

24. A device as claimed in claim 16 and further characterized in that a drum is provided to rotate with the rotatable slave member; said drum having indicia on the peripheral surface to indicate the operation taking place in the cycle of operation.

References Cited by the Examiner
UNITED STATES PATENTS

| | | | |
|---|---|---|---|
| 2,338,305 | 1/44 | Simmon | 200—38 |
| 2,420,874 | 5/47 | Fowler | 307—141.4 |
| 2,467,944 | 4/49 | Muson | 307—141.4 |
| 2,555,508 | 6/51 | Pudelko | 200—38 |
| 2,578,347 | 12/51 | Gagnaire | 200—38 |
| 2,592,705 | 4/52 | Jewell et al. | 200—38 |
| 2,889,419 | 6/59 | Miller et al. | 200—38 |
| 2,939,336 | 6/60 | Hetzer | 200—38 |
| 2,964,933 | 12/60 | Fritz | 200—38 |

FOREIGN PATENTS 1,054,397  2/54  France.

LLOYD McCOLLUM, *Primary Examiner.*

RICHARD M. WOOD, ROBERT L. SIMS, MILTON O. HIRSHFIELD, *Examiners.*